March 24, 1959  F. T. PARKER  2,879,462
DYNAMIC BRAKING CONTROL FOR MULTIPLE UNIT OPERATION
Filed March 21, 1955
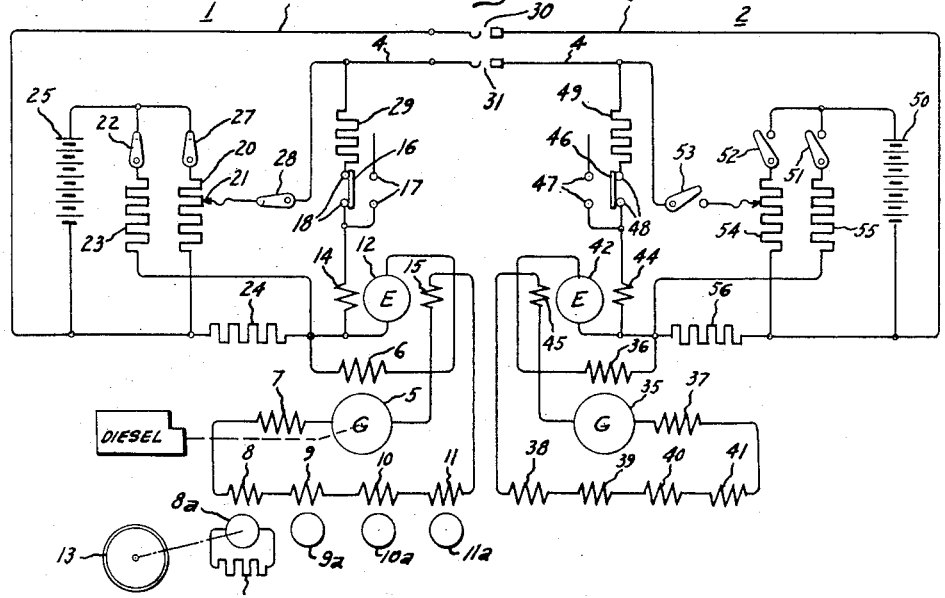
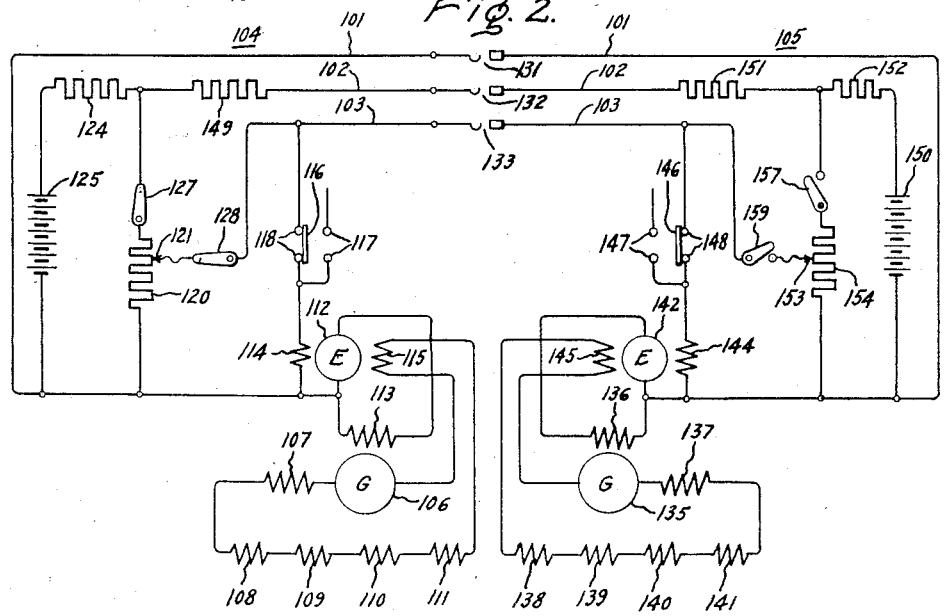
Inventor:
Fred T. Parker,
by
His Attorney.

United States Patent Office 2,879,462
Patented Mar. 24, 1959

2,879,462

DYNAMIC BRAKING CONTROL FOR MULTIPLE UNIT OPERATION

Fred T. Parker, Erie, Pa., assignor to General Electric Company, a corporation of New York Application March 21, 1955, Serial No. 495,644

5 Claims. (Cl. 318—381)

My invention relates to a dynamic braking control system for self-powered vehicles provided with direct current electric motors and more particularly for controlling the dynamic braking of a plurality of self-powered vehicles such as diesel electric locomotives connected together for mutiple unit operation.

One of the most advantageous features of direct current traction motors is the availability of dynamic braking with the resultant conservation of mechanical brake shoe wear. Dynamic or electric braking is usually accomplished by connecting the armatures of traction motors in a loop circuit with resistors to provide for dissipation of the power generated by the motors operating as generators and being driven by the momentum of the moving vehicle or vehicles connected thereto. With dynamic braking, wheel slides can be readily controlled with a resultant conservation of the driving wheels. In multiple unit operation, however, it is necessary to control the dynamic braking from one position or control panel in one of the locomotives. Moreover, the braking effort exerted by each of the traction motors must be limited to a safe maximum value so that no one of the motors is damaged during the maximum braking effort. This braking effort is proportional to the square of the speed times the motor field excitation. As the speed of the vehicle must necessarily vary during the dynamic braking, it is desirable to control the excitation of the motor fields by separately exciting these fields from the main generator. With the use of a multiple unit locomotive which uses the exciter for the main generator excitation, it has been found that the practice of supplying all generator field current for a plurality of locomotives requires more power than is practicable to supply from one exciter. The solution of connecting all of the traction motor field windings of all of the locomotives in series is impracticable because of the multiplicity of setup switches and special high current cables required.

Therefore, an object of this invention is a simple, reliable and inexpensive control system for controlling the dynamic braking of a diesel electric locomotive.

A further object is to provide a system for controlling the dynamic braking of a plurality of locomotives from a single point in one of the locomotives with a small control current.

A further object is to provide a simple and reliable system for maintaining electrical stability in the dynamic braking of each of the locomotives.

In carrying out my invention in one form, the train lines or control wires running lengthwise of the train are energized through voltage varying means from a low voltage source such as a storage battery in one locomotive. The exciters of each locomotive are connected to be energized from the train lines, and the voltage thereacross controls the excitation of the exciter, thus controlling the voltage of the generators on each locomotive. During dynamic braking, the field windings of the traction motors are serially connected with each other across the generator and each motor armature is connected to a braking resistor so that the generator voltage controls the braking effort of the traction motors. To obtain electrical stability in each locomotive, the generator current is passed through a differential field winding on the exciter for the generator to reduce the exciter current supplied to the generator field winding as the generator current increases and thus limit the motor field winding current.

Further objects and advantages of my invention will become apparent and my invention will be better understood from the following description with reference to the accompanying drawings. The features of novelty which characterize my invention will be pointed out with particularity in the claims annexed to and forming part of this specification.

Fig. 1 is a schematic of one embodiment of my invention showing the electric connections for excitation of the generators of a control locomotive and a trailing locomotive during dynamic braking.

Fig. 2 is a schematic of another embodiment of my invention using three train lines.

Referring to the drawings, I show, in Fig. 1, the schematic setup for energizing the traction motors of two locomotives 1 and 2 during dynamic braking. These locomotives 1 and 2 may be connected together by train lines or control wires 3 running lengthwise of the two locomotives so that the dynamic braking in both locomotives may be controlled from one locomotive. The main generator 5 of the control locomotive 1 is driven by a diesel engine and is energized by a separately excited winding 6 and a compensating winding 7 and connected to energize locally the field windings 8, 9, 10 and 11 of the traction motors of the locomotive 1, the field windings being connected in series with each other, as shown. The winding 6 of the generator 5 is excited locally by the exciter 12. The excitation of the exciter 12 is controlled by its main separately excited shunt field winding 14 and a differential winding 15, connected in circuit with the armature of the generator 5, which reduces or limits the voltage of the exciter 12. By means of the series connection of the field windings 8, 9, 10, and 11, the traction motors are energized, each to provide the same braking effort on a driver wheel as illustrated by a wheel 13. The current in each motor armature (shown as armatures 8a, 9a, 10a and 11a) is limited by similar braking resistors (one shown as 19) which is connected across the armature during dynamic braking.

When the operator desires to apply dynamic braking, he moves the contactor 16 from the contacts 17, which connect the field winding 14 to the acceleration control, to shunt the contacts 18, as shown, so that the current in the shunt field winding 14 of the exciter 12 may be regulated by varying the voltage of the train line 4. The voltage of the train line 4 is controlled from a braking voltage divider 20 by moving a voltage tap 21 to which the line wire 4 is connected during dynamic braking.

To prepare the circuit for braking in the control locomotive 1, a switch 22 is closed to place the resistors 23 and 24 in series with each other across a low voltage battery 25, as shown. A switch 27 is closed to connect the voltage divider 20 in parallel with the resistors 23 and 24. In order to connect a resistor 29 and the shunt field winding 14 of the exciter 12 to be energized by the battery 25, a switch 28 is closed to energize the train line 4 from the voltage tap 21. It should be noted that the voltage tap 21 may be moved from one end of the voltage divider 20 to the other end, allowing control of the braking effort from zero to maximum by simply moving the voltage tap 21. The resistors 23 and 24 are proportioned with resistor 23, the larger, so that with voltage tap 21 at the lowest voltage position, the current flow through shunt field winding 14 is in the reverse direction and of the proper value to just overcome the residual voltage of the main generator 5 to insure zero braking effort at the minimum braking handle position.

In operation, after these dynamic braking connections have been made, as shown in the drawing, the operator moves the voltage tap 21 of the voltage divider 20 to vary the current in the field winding 14 and thereby control the braking effort of the traction motors. Should the current in the field windings 8, 9, 10 and 11 be excessive, the exciter differential winding 15, which is serially connected to carry this current, will reduce the excitation of the exciter 12 and thus reduce the current in the field winding 6 and thereby reduce the excitation produced by the field winding 6 in the generator 5 with consequent reduction in the current in the field windings 8, 9, 10 and 11.

This provides a simple and inexpensive control system for regulating the braking effort of several traction motors on a control locomotive. However, locomotives are often connected so that two or more will haul a heavy train. In such cases, train lines are used to connect the various control systems so that the locomotives act in unison to regulate the speed of the train. Train lines 3 and 4 are connected by the connectors 30 and 31 to train lines 3 and 4 of the trailing locomotive 2. In the locomotive 2, the traction motors have field windings 38, 39, 40 and 41 which are serially connected with the compensating winding 37 across the generator 35 during dynamic braking. In the locomotive 2 a generator 35 is driven by a separate diesel engine (not shown). A separately excited field winding 36 of the generator 35 is energized locally by the exciter 42.

In order to control the voltage across the field winding 36, an exciter shunt field winding 44 is connected to be energized from the train lines 3 and 4. The differential field winding 45 of the exciter 42 is connected in series with the armature of the generator 35 to locally control the excitation of the generator and limit the current therethrough. In order to prepare the second locomotive for dynamic braking, a contactor 46 is positioned to shunt the contacts 48 whereby the field winding 44 is energized from the battery 25 through the train line 4, the connector 31, and a resistor 49. The contacts 47 are similar to the contacts 17 and are connected to the accelerating control.

When locomotive 1 has the operator's control position, a battery 50 of the second locomotive is used only to supply the current through the resistors 55 and 56 so that the residual voltage of the generator 35 may be controlled from the voltage tap 21. The switches 52 and 53 are open to prevent any losses resulting from current flow through the voltage divider 54. However, if locomotives 1 and 2 are used separately, the control of locomotive 2 is identical to that of locomotive 1. Similary, if more than two locomotives are used, the train lines 3 and 4 will be connected to each of the trailing locomotives so that the position of the voltage tap 21 of the voltage divider 20 will regulate the excitation of all of the shunt field windings of the exciters to control the excitation of the main generators of each of the locomotives.

Referring to Fig. 2, I have shown another embodiment of my invention using the same fundamental excitation system as that shown in Fig. 1. In this system, I use three train lines, 101, 102 and 103 to connect the lead or control locomotive 104 to the trailing unit 105. The third line is connected to utilize the batteries of the trailing units to supplement the battery of the lead locomotive. In the lead locomotive, the generator 106, having a compensating field winding 107, is connected across the serially connected traction motor field windings 108, 109, 110, and 111 to energize them locally during dynamic braking. The exciter 112 is connected to energize locally the main generator field winding 113 and control the voltage thereacross.

The excitation of the separately excited field winding 114 of the exciter 112 is controlled from the battery 125 through the train lines 101 and 103, and the differential field winding 115 is serially connected to sense the current output of the generator 106. In order to set up the control locomotive 104 for dynamic braking, the contactor 116 is moved to shunt the contacts 118 (as shown) connecting the exciter field winding 114 between the train lines 101 and 103. The train line 101 is connected to one side of the voltage divider 120 and the train line 103 is energized by the closing of the switch 128 on voltage tap 121 and the switch 127 which places the voltage divider 120 across the battery 125 in series with the resistor 124. The movable voltage tap 121 on the voltage divider 120 regulates the braking effort of the traction motors having the field windings 108, 109, 110, and 111 by varying the voltage between the train lines 101 and 103 and thus controlling the excitation of the exciter 112 which in turn controls the voltage of the generator 106.

In order to control the braking effort in the locomotive 105, the train lines 101, 102, and 103 of the lead locomotive 104 are connected to the train lines 101, 102, and 103 respectively of the trailing locomotive 105 by the connectors 131, 132, and 133.

The main generator 135 of the trailing locomotive 105 is serially connected with a compensating winding 137 to energize locally the serially connected traction motor field windings 138, 139, 140 and 141. The main winding 136 of a generator 135 is separately excited from the exciter 142. The main winding 144 of the exciter 142 is connected to be excited from the voltage tap 121 which varies the voltage between the train lines 101 and 103. However, to locally limit the current in the traction motor field windings, the differential field winding 145 of the exciter 142 is serially connected in the armature circuit of the generator 135.

To prepare for dynamic braking in the trailing locomotive 105, the contactor 146 is moved to shunt the contacts 148 (as shown) so that the shunt field winding 144 of the exciter 142 is connected between the train lines 101 and 103. With this connection, the operator may regulate the current in the traction motor field windings 138, 139, 140, and 141 of the trailing unit by regulating the position of the voltage tap 121 on the voltage divider 120 in the control locomotive 104 which varies the voltage between the train lines 101 and 103 to control the exciter voltage.

The resistor 149 is connected in circuit with battery 150 through the train line 102 and the resistors 151 and 152, so that the train line 102 is energized from the batteries of the trailing locomotives as well as the battery 125 of the leading locomotive. The train line 101 is connected in circut with the other side of the batteries 125 and 150 so that the batteries are connected in parallel to prevent excessive voltage drop across the resistor 124 of the lead locomotive 104 when two or more locomotive exciters are energized from one control position. The switch 157 remains open so that the voltage divider 154 does not shunt any current across battery 150 which would lower the voltage of the train line 102. The switch 159 remains open so that the position of the voltage tap 153 will not control the signal voltage of the train line 103.

It may be readily seen that the trailing locomotive 105 may be used as the control locomotive by closing the switches 157 and 159, and the locomotive 104 may be used as a trailing unit by opening the switches 127 and 128.

With the connections I have shown in Figs. 1 and 2, the train lines are only required to carry enough current to energize the separately excited field windings of the exciters in the locomotives. This current is small compared to the current that would be necessary if it were attempted to connect all of the traction motor field windings to be energized from a single generator or all of the generator field windings to be energized from one exciter. If it is attempted to connect all of the motor or generator field windings in series to reduce the total current in the train lines, it is necessary to use complex jumper arrangements in the connectors so that the circuits of the train lines are not opened by the removal of the trailing units. In view of the fact that the train lines 3 and 101 are necessary as a grounding connection regardless of whether this dynamic braking system is used, this connection provides a simpler system than has been obtained in the past.

In summary, referring again to Fig. 1, the operator regulates the voltage of the train line 4 and thus the total braking effort of all the locomotives by regulating the position of the voltage tap 21 on the voltage divider 20 to regulate the field produced by the field windings 14 and 44 for the exciters 12 and 42 respectively. Referring to Fig. 2, the operator regulates the field produced by the field windings 114 and 144 by controlling the position of the voltage tap 121.

Thus, the operator is able to control the excitation of the main generators in all of the locomotives of the train. With the differential field windings in circuit with the exciter as shown, this system results in a locally stable and simple system which may be applied to all locomotives of the separately excited generator type.

While I have shown and described particular embodiments of my invention, modifications will occur to those skilled in the art, and I intend, therefore, by the appended claims to cover all modifications that come within the true spirit and scope of my invention.

What I claim as new and desire to secure by Letters Patent of the United States is:

1. In a dynamic braking control system for a self-propelled diesel electric vehicle, a pair of train lines, a battery, a voltage divider connected across said battery, a movable voltage tap on said voltage divider, one end of said voltage divider and said movable tap each being connected to one of said pair of train lines to provide a variable voltage between said train lines during dynamic braking, a generator having a separately excited field winding, traction motor field windings serially connected to be energized by said generator, an exciter having a separately excited shunt field winding and a differential field winding, said exciter being connected to energize said generator field winding, electric circuit means for connecting said exciter shunt field winding to said train lines for energization of said exciter field winding from said battery and control thereof by said voltage divider to provide for control of the excitation of said generator from said train lines, and means for connecting said differential field winding in circuit with said generator thereby to reduce the exciter voltage and limit the current of said generator during dynamic braking.

2. In a dynamic braking control system for multiple unit operation of self-propelled diesel electric vehicles, a pair of train lines for carrying braking signals between said vehicles, a battery mounted in one vehicle, a voltage divider connected across said battery, a movable voltage tap on said voltage divider, one end of said voltage divider and said movable tap each being connected to one of said pair of train lines to provide a variable voltage between said train lines during dynamic braking, a generator in each vehicle having a separately excited field winding, traction motor field windings serially connected to be energized locally by each of said generators, an exciter in each vehicle having a separately excited shunt field winding and a differential field winding, said exciters being connected respectively to energize said field winding of said generators, electric circuit means for connecting said exciter shunt field winding of each exciter to said train lines for energization of said exciter field windings from said battery and control thereof by said voltage divider to provide for control of the excitation of said generators from said train lines, and means connecting said differential field windings in circuit respectively with said generators thereby to reduce the exciter voltage and locally limit the current of said generators during dynamic braking.

3. In a dynamic braking control system for multiple unit operation of self-propelled diesel electric vehicles, a pair of train lines connectable between a first and a second locomotive for carrying a braking signal between said locomotives, a first source of low voltage power in said first locomotive connectable in circuit with said pair of train lines, means connected to said source for varying the potential between said pair of train lines, a second source of low voltage in said second locomotive, a third train line connectable to said first source, said second source being connectable between said third train line and one of said pair of train lines to provide a portion of the power to be regulated by said means, traction motors in each of said lomocomtives drivable as generators to retard each of said locomotives respectively by dynamic braking, each of said motors having a separately excitable field winding, a generator in said first locomotive connected to be driven by a prime mover to energize motor field windings in said first locomotive during dynamic braking, another similar generator in said second locomotive connected to energize said motor field winding in said second locomotive during dynamic braking, said generators each being provided with a main field winding, an exciter machine in each locomotive connected to energize locally each of said generator main field windings, said exciter machines each being provided with an excitation winding connected to be energized from said train lines during dynamic braking whereby said means controls the braking effort of both locomotives.

4. In a dynamic braking control system for multiple unit operation of self-propelled diesel electric vehicles, a pair of train lines connectable between a first and a second locomotive for carrying a braking signal between said locomotives, a first source of low voltage power in said first locomotive, a voltage divider connectable in circuit with said pair of train lines and said source for controlling the potential between said train lines, a second source of low voltage in said second locomotive, a third train line connectable to said first source, said second source being connectable in circuit with said third train line and one of said pair of train lines to provide a portion of the power to be controlled by said voltage divider, traction motors in each of said locomotives drivable as generators to retard each of said locomotives respectively by dynamic braking, each of said motors having a separately excitable field winding, a generator in each of said locomotives drivably connectable to a prime mover and connected energize locally said motor field windings during dynamic braking, said generators each being provided with a main field winding, an exciter machine in each locomotive connected to energize locally said generator main field winding, said exciter machines each being provided with an excitation winding connected to be energized from said train lines during dynamic braking whereby said voltage divider controls the braking effort of both locomotives.

5. In a dynamic braking control system for multiple unit operation of self-propelled diesel electric vehicles, train lines connectable between a first and a second locomotive for carrying a braking signal between said locomotives, a battery in said first locomotive connectable in circuit with a pair of said train lines, an impedance connected in circuit with said battery for varying the potential between said pair, a second battery in said second locomotive, a third train line connectable to said first battery, said second battery being connectible between said third train line and one of said pair of train lines to provide a portion of the power to be regulated by said impedance, a first traction motor in said first locomotive drivable as a generator to retard said first locomotive by dynamic braking, a second traction motor in said second locomotive drivable as a generator to retard said second locomotive by dynamic braking, each of said motors having a separately excitable field winding, a first generator in said first locomotive drivably connected to a prime mover to energize said field winding of said first motor during dynamic braking, a first exciter machine in said first locomotive having a main field winding and a differential field winding, a field winding of said first generator connectable to said first exciter for energization thereby, said differential winding being excitable in proportion to current in said first motor field windings to limit locally the braking effort, a second generator in said second locomotive drivably connected to a prime mover to energize said field winding of said second motor during dynamic braking, a second exciter machine in said second locomotive having a main field winding and a differential field winding, a field winding of said second generator connectable to said second exciter for energization thereby, said differential winding being excitable in proportion to current in said second motor field winding to limit locally the braking effort, and said main excitation winding of each of said exciter machines being energizable from said pair of train lines during dynamic braking whereby said impedance controls the braking effort of both of said locomotives.

References Cited in the file of this patent
UNITED STATES PATENTS 2,306,182   Ogden _____ Dec. 22, 1942